E. COCHRAN.

LAMP GLOBE FIXTURE

APPLICATION FILED MAR. 25, 1918.

Reissued June 4, 1918.

14,478.

Inventor

Eugene Cochran

By Ord & Billman

Attorney

UNITED STATES PATENT OFFICE.

EUGENE COCHRAN, OF CLEVELAND, OHIO.

LAMP-GLOBE FIXTURE.

14,478. Specification of Reissued Letters Patent. Reissued June 4, 1918.

Original No. 1,208,750, dated December 19, 1916, Serial No. 38,454, filed July 7, 1915. Application for reissue filed March 25, 1918. Serial No. 224,632.

*To all whom it may concern:*

Be it known that I, EUGENE COCHRAN, a citizen of the United States, residing at Cleveland, in the county of Cuyahoga and State of Ohio, have invented certain new and useful Improvements in Lamp-Globe Fixtures, of which the following is a specification.

This invention relates to fixtures for suspending lamp globes or the like.

Ordinarily, suspended globes used in indirect or semi-direct lighting are suspended by means of chains which are connected to the globe by hooks or other devices engaging in holes drilled in the shade. This is objectionable because of the expense of drilling the holes and also because expensive globes are often broken in the drilling operation.

The object of the invention is to avoid these defects, by providing an improved clip or connection between the chains and the globe with which it is unnecessary to drill holes in the latter, the clip engaging the rim or flange of the globe and having a bend or loop to pass through the lower link of the chain, the clip being retained on the rim by a spring gripping action.

The invention is illustrated in the accompanying drawings, in which—

Figure 1:
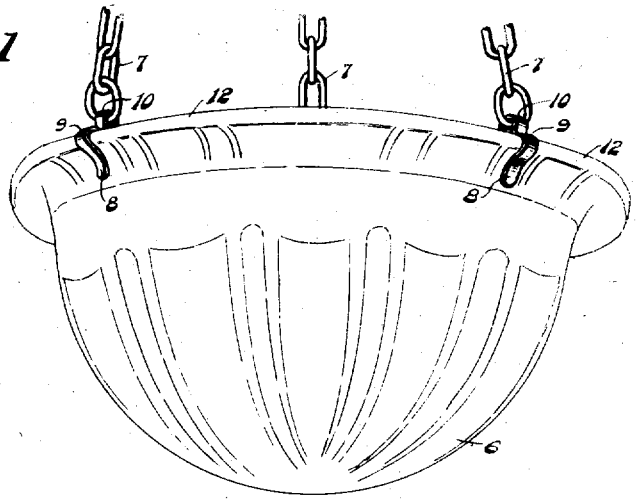
Figure 1, is a side elevation of a fixture provided with the device.
Figure 2:
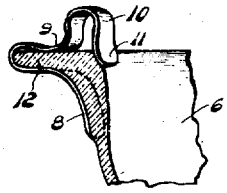
Fig. 2, is a detail in section.

Referring specifically to the drawings, 6 indicates the lamp shade or bowl and 7 the chains by which it is suspended. Each chain is connected to the bowl by means of a clip which may be made of a strip of spring metal, bent to form a lower arm 8 and an upper arm 9 which latter is formed near its inner end into a bend or loop 10 with an end or extremity 11 projecting inwardly a sufficient distance to lap or engage within the rim of the globe. The loop 10 is passed into or through the lower link of the chain, and the clip is then sprung on the rim 12 of the globe, the rim being engaged with spring pressure between the upper and lower arms 8 and 9, and the projection 11 snapping down within the globe, and serving to prevent the clip from accidentally slipping off of the rim of the globe. The ordinary inclination of the chains, toward a central point above, also tends to draw the clip inwardly on the globe rim and assists in preventing accidental detachment thereof. By special effort the clip can be slipped off of the rim, permitting the globe to be easily detached and removed, for cleaning or other purposes.

By the means described the globe can be easily and quickly attached to the suspending chains, and drilling of holes in the globe is unnecessary.

Having thus described one of the embodiments of my invention, what I claim and desire to secure by Letters Patent, is:—

1. A clip for shade hangers, comprising a single strip of metal bent upon itself forming upper and lower spring arms adapted to receive the rim of the shade to be suspended, said upper arm being bent into an upwardly projecting loop and terminating in a downwardly projecting spring finger resiliently engaging within the inner side of the suspended shade for holding the clip thereon.

2. A clip for shade hangers, comprising a single length of metal bent upon itself forming upper and lower spring arms curved to conform to and engage with the rim of the shade to be suspended, said upper arm being provided with a loop to receive a hanger member and terminating in a downwardly projecting finger engaging within the rim of the shade and removably holding the clip in position.

3. A lamp fixture, comprising a shade having an outwardly projecting horizontal rim, hanger clips each comprising a single strip of metal bent upon itself forming upper and lower horizontally extending spring arms engaging the upper and lower sides of said horizontal rim, said upper arms terminating in upwardly extending loops projecting above said rim and having downwardly projecting spring fingers at their inner ends engaging within said shade to hold the clips on said rim, and hanger members detachably connected to said upwardly extending loops.

4. A clip for shade hangers comprising a single strip of metal bent to form upper and lower arms with a spring connection at their outer ends whereby the arms will closely engage the upper and lower surfaces of the rim of a shade, the upper arm having a loop at its inner end to receive a suspending device and a downwardly projecting finger at the inner end of the loop, to engage within said rim, and the inner end of the lower arm being extended downwardly to fit against the outer side of the shade.

In testimony whereof I have affixed my signature in the presence of two witnesses.

EUGENE COCHRAN.

Witnesses:

HENRY E. RIKER,
EVELYN L. PEJEAU.

Copies of this patent may be obtained for five cents each, by addressing the "Commissioner of Patents, Washington, D. C."